(12) United States Patent
Bober

(10) Patent No.: US 7,043,810 B2
(45) Date of Patent: May 16, 2006

(54) MODULAR SUB-CABINET FOR MOTION FURNITURE

(76) Inventor: Wieslaw Bober, 350 Fifth Ave., Suite 5817, New York, NY (US) 10118

( * ) Notice: Subject to any disclaimer, the term of this patent is extended or adjusted under 35 U.S.C. 154(b) by 0 days.

(21) Appl. No.: 10/977,789

(22) Filed: Oct. 29, 2004

(65) Prior Publication Data

US 2005/0057129 A1 Mar. 17, 2005

Related U.S. Application Data

(63) Continuation of application No. 10/373,997, filed on Feb. 25, 2003, now Pat. No. 6,902,243.

(51) Int. Cl.
*B23P 23/00* (2006.01)
(52) U.S. Cl. ............... 29/401.1; 29/434; 29/469
(58) Field of Classification Search ............ 29/91.1, 29/428, 434, 469, 401.1; 312/312, 283, 290, 312/196, 306, 319.3, 319.7; 108/147
See application file for complete search history.

(56) References Cited

U.S. PATENT DOCUMENTS

| | | | |
|---|---|---|---|
| 2,422,350 A | 6/1947 | Gross | 312/186 |
| 2,472,722 A | 6/1949 | Newstead | 311/39 |
| 2,687,934 A | 8/1954 | Gipple | 312/282 |
| 2,904,380 A | 9/1959 | Mark | 312/27 |
| 3,794,400 A | 2/1974 | Guth | 312/269 |
| 3,857,992 A | 12/1974 | Lehmann | 174/52 R |
| 3,932,009 A | 1/1976 | Zollinger | 312/312 |
| 3,943,844 A | 3/1976 | Standbridge et al. | 100/53 |
| 4,400,736 A | 8/1983 | Weiss | 358/254 |
| 4,610,489 A * | 9/1986 | Dibert et al. | 312/227 |
| 5,680,820 A | 10/1997 | Randolph | 108/25 |
| 5,761,786 A * | 6/1998 | Simons | 29/401.1 |
| 5,797,666 A | 8/1998 | Park | 312/319.5 |
| 6,073,892 A | 6/2000 | Dittmer | 248/157 |
| 6,286,441 B1 * | 9/2001 | Burdi et al. | 108/147 |
| 6,329,617 B1 | 12/2001 | Burgess | 200/61.43 |
| 6,336,692 B1 * | 1/2002 | Snyder | 312/312 |
| 6,471,311 B1 * | 10/2002 | Snyder | 312/247 |

(Continued)

FOREIGN PATENT DOCUMENTS

DE 2360284 A * 6/1975

(Continued)

*Primary Examiner*—Essama Omega
(74) *Attorney, Agent, or Firm*—Wolf Block Schorr & Solis-Cohen LLP

(57) ABSTRACT

The present invention is a sub-cabinet readily insertable and removable from a larger decorative cabinet. The invention is comprised of a box-like structure having at least three panels perpendicularly disposed with respect to a floor panel and attached thereto, a lift vertically disposed within the box-like structure and fastened thereto, and a control module disposed within the box-like structure and fastened thereto. The control module receives commands from a limit switch so as to stop the lift motion when fully retracted or extended. Furthermore, the control module regulates electrical power to a display device fastened to the lift based upon the direction of travel of the support unit. The control module receives function commands from either a wireless remote or a switch. An alternate embodiment of the present invention further comprises a safety strip attached about an edge along one or more panels adjacent to a movable lid hinged to a decorative cabinet. The safety strip communicates with the control module so as to reverse the direction of the lift when contacted. Another embodiment of the present invention further comprises one or more storage areas within the box-like structure.

6 Claims, 14 Drawing Sheets

U.S. PATENT DOCUMENTS

| | | | |
|---|---|---|---|
| 6,494,150 B1 | 12/2002 | Phoenix et al. | 108/147 |
| 6,612,670 B1 | 9/2003 | Liu | 312/312 |
| 6,622,366 B1 * | 9/2003 | Luffel et al. | 29/434 |
| 6,733,094 B1 | 5/2004 | Chang | 312/7.2 |
| 6,902,243 B1 * | 6/2005 | Bober | 312/306 |
| 2002/0101139 A1 | 8/2002 | Lee | 312/196 |
| 2004/0041500 A1 * | 3/2004 | Appino | 312/267 |
| 2004/0221775 A1 * | 11/2004 | Okninski | 108/147 |
| 2005/0046315 A1 * | 3/2005 | Doane et al. | 312/196 |
| 2005/0248243 A1 * | 11/2005 | Bober | |

FOREIGN PATENT DOCUMENTS

| | | |
|---|---|---|
| DE | 2745836 A * | 4/1979 |
| DE | 3021363 A * | 12/1981 |

* cited by examiner

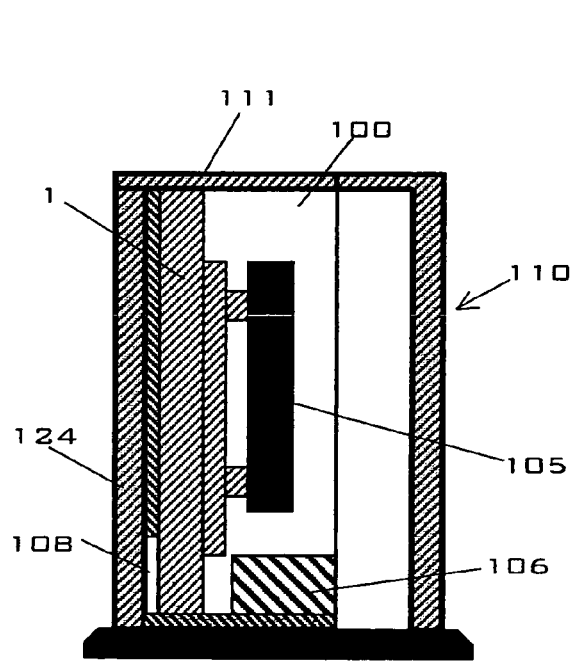
Fig. 7
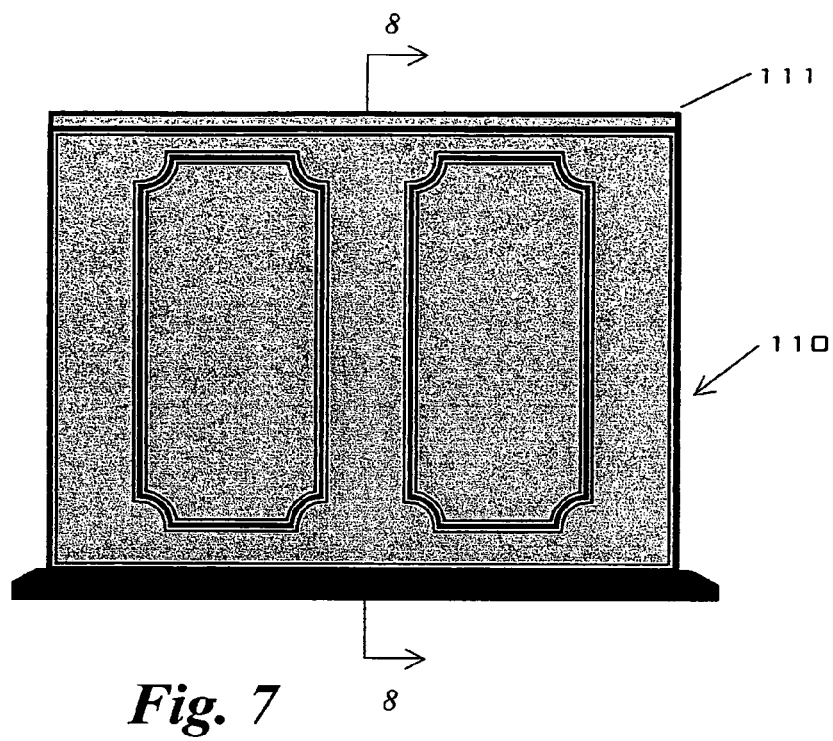
Fig. 8
Fig. 9

MODULAR SUB-CABINET FOR MOTION FURNITURE

CROSS REFERENCE TO RELATED APPLICATIONS

This application is a countinuation from application Ser. No. 10/373,997 filed on Feb. 25, 2003.

FEDERALLY SPONSORED RESEARCH OR DEVELOPMENT

None.

BACKGROUND OF THE INVENTION

1. Field of the Invention

The present invention generally relates to a mechanically and electrically integrated sub-cabinet for use within a larger decorative cabinet. Specifically, the invention is a box-like structure having a motorized lift, a control module and a safety strip mechanically integrated therein and electrically connected so as to control operation of the lift.

2. Description of the Related Art

Television designs are focused on low-profile devices including but not limited to plasma screens and LCD panels. Low-profile televisions maximize viewing area and minimize unit depth. However, designs are inherently less decorative, less physically stable, and heavier than tube-based televisions.

Aesthetic and stability deficiencies of low-profile televisions are addressed by housing the television within a cabinet. In such applications, the low-profile television is extended from and retracted into a cabinet via a lift. The application of a lift within a cabinet, desk, mirror, or picture frame is referred to herein as motion furniture.

Lift devices increase the complexity and cost of furniture manufacture and thereby limit their application to the high-end market. Conventional furniture design for the mass market is generally limited to wood and plastic construction with a decorative finish and minimal moving parts. Electrically powered mechanisms are generally not offered in conventional furniture since most manufacturers are neither facilitized nor staffed for the installation of wiring, couplings, and electrical components.

Lift devices also decrease the reliability of furniture via the introduction of electrically powered and mechanically movable components. As such, component repair and replacement increases the cost of ownership and reduces affordability.

What is required is a modular unit both mechanically and electrically integrated so as to provide a slide-in solution for decorative furniture thereby reducing the manufacturing costs and complexities associated with the integration of lift technology into furniture for the mass market.

What is required is a modular unit both mechanically and electrically integrated so as to facilitate the rapid and low-cost repair and/or replacement of electrically powered and mechanically movable components thereby improving the affordability of lift technology in furniture for the mass market.

SUMMARY OF THE INVENTION

An object of the present invention is to provide a modular sub-cabinet that is both mechanically and electrically integrated so as to provide a slide-in solution for lift technology applicable to decorative furniture.

A further object of the present invention is to provide a modular sub-cabinet that is both mechanically and electrically integrated so as to facilitate the rapid and low-cost repair and/or replacement of electrically powered and mechanically movable lift technology.

The present invention is a sub-cabinet insertable and removable from a larger decorative cabinet. The invention is comprised of a box-like structure having at least three panels perpendicularly disposed with respect to a floor panel and attached thereto, a lift vertically disposed within the box-like structure and fastened to one panel, and a control module disposed within the box-like structure and fastened thereto. The control module receives commands from a limit switch so as to stop the motion of the lift when fully extended or retracted. Furthermore, the control module terminates electrical power to a television fastened to the lift when retracting into the box-like structure. The control module receives function commands from either a wireless remote or a manual switch.

An alternate embodiment of the present invention further comprises a safety strip attached about an edge along one or more panels adjacent to a movable lid hinged to a decorative cabinet. The safety strip communicates with the control module so as to reverse the direction of the lift when contacted. While various types of safety strip devices are applicable to the present invention, preferred embodiments include a pressure sensitive device.

In yet another embodiment of the present invention, one or more storage areas are provided within the box-like structure.

Two advantages are offered by the present invention. The invention reduces the cost and complexity associated with the assembly of motion furniture by providing a single, fully functional slide-in component capable of extending and retracting a television from decorative furniture or a computer display from office furniture. The invention increases the affordability of motion furniture within the mass market via a modular design that allows for the rapid removal and replacement of a defective unit.

The present invention is applicable to a variety of uses. For example, the invention may be used to extend and retract a television, computer display or other electronic component from a decorative cabinet at the foot of a bed, a decorative cabinet against a wall, a decorative cabinet built into the footboard of a bed, a picture frame, a mirror, a night stand, or a desk.

BRIEF DESCRIPTION OF THE DRAWINGS

The invention will now be described in more detail, by way of example only, with reference to the accompanying drawings, in which:

FIG. 7 is a front elevation view of an exemplary decorative cabinet.

FIG. 8 is a section view of the exemplary decorative cabinet with television retracted into sub-cabinet.

FIG. 9 is a section view of the exemplary decorative cabinet with television extended from sub-cabinet.

REFERENCE NUMERALS

Figure 1:
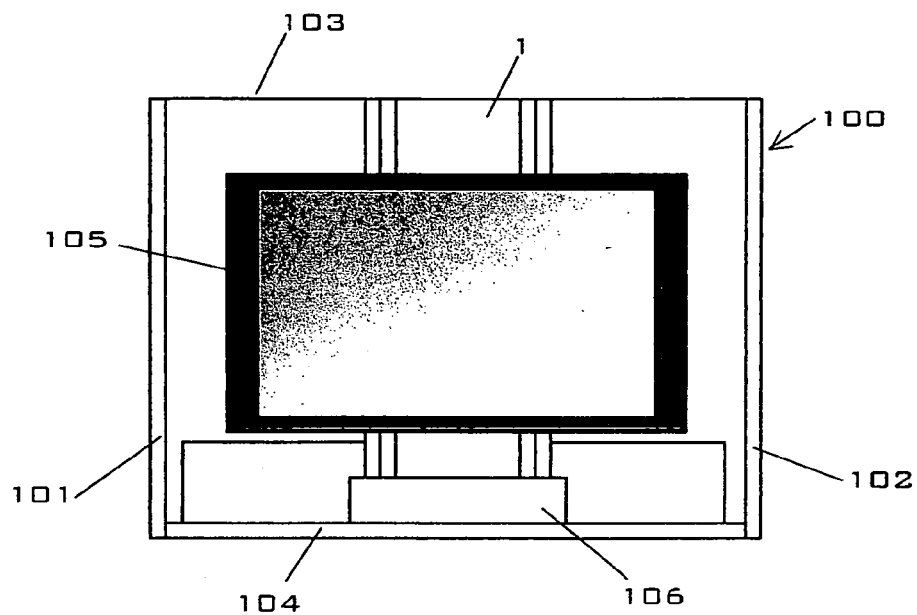
FIG. 1 is a front elevation view of the present invention showing television, lift and control module within sub-cabinet.

1 Lift
2 Base unit
3 Support unit
4 Vertical support element
5 Horizontal support element
6 Bracket
7 Motor
8 Drive screw
9 Coupler
10 Rail
11 Base plate
12 End plate
13 Stiffener
14 Elevator element
15 Limit switch
16 Stop
17 Fastener
18 Washer
19 Horizontal rest
20 Fastener
21 Nut
22 Elevator plate
23 T-shaped guide
24 Fastener
25 Power cord
26 Fastener
27 Rod
28 Controller/transformer
29 Remote control receiver
30 Fastener
31 Mounting hole
32 Bracket
33 Nut
34 Upper end
35 Lower end
36 Mounting cap
37 Flange
38 Washer
100 Sub-cabinet
101 Left panel
102 Right panel
103 Back panel
104 Floor panel
105 Television
106 Control module
107 Mounting hole
108 Opening
109 Handle opening
110 Decorative cabinet
111 Lid
112 Storage area
113 Door
114 Front panel
115 Safety strip
116 Shelf
117 Component storage area
118 Component storage area
119 Bracket
120 Bracket
121 Closer
122 Pin
123 Pin
124 Wall
125 Socket
126 Switch
127 Fastener
128 Shelf
129 Cabinet front
130 Edge

DESCRIPTION OF THE INVENTION

Figure 2:
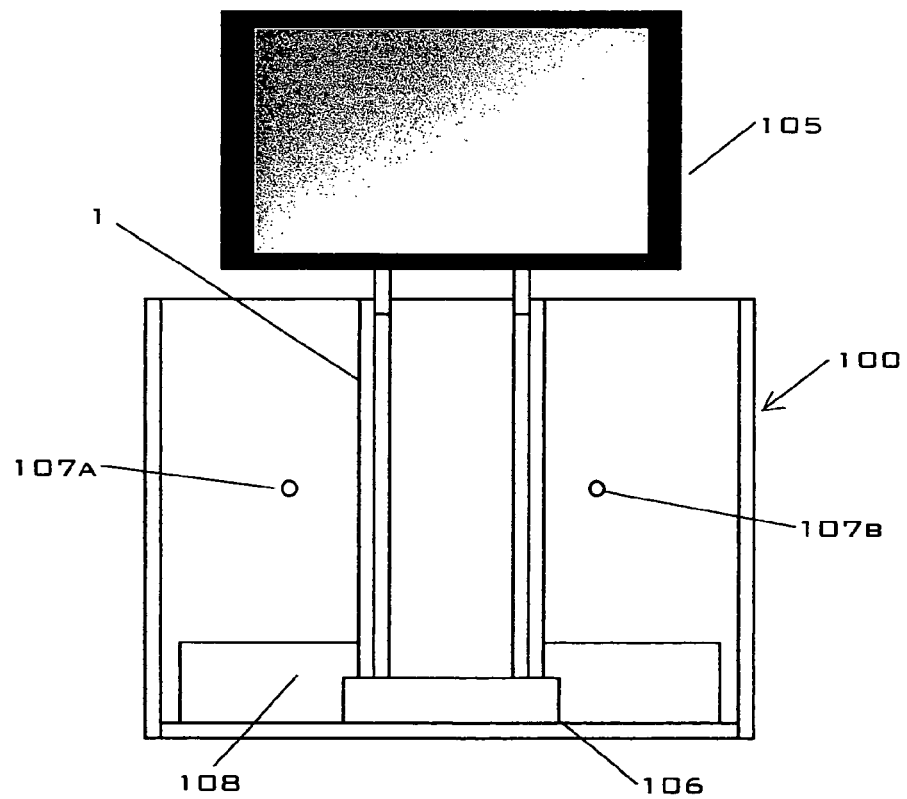
FIG. 2 is a front elevation view of the present invention showing lift extended and television above sub-cabinet.

Referring to FIG. 1, an embodiment of the present invention, herein a sub-cabinet 100, is shown comprised of a box-like structure within which is secured a lift 1 and a control module 106. FIG. 2 shows the embodiment described in FIG. 1 whereby the lift 1 is extended so that the television 105 attached to the lift 1 resides above the sub-cabinet 100.

The box-like structure is constructed of a left panel 101, a right panel 102, a back panel 103, and a floor panel 104. Panel elements are planar shaped and composed of wood, preferably plywood or particle board. Panels are fastened into the desired shape via assembly techniques understood in the art. For example, left panel 101 and right panel 102 are secured to opposite ends of back panel 103 and floor panel 104 via flat head screws or recessed bolts. Thereafter, back panel 103 is secured to floor panel 104 via the fasteners described. Overlapping joints between panel elements are further strengthened via a wood glue. In some applications, dowels are inserted into mutually opposed holes along the joint between two panels. In other applications, it may be desired to further strengthen joints via the inclusion of molding nailed or screwed to the panels along the joint.

Figure 4:
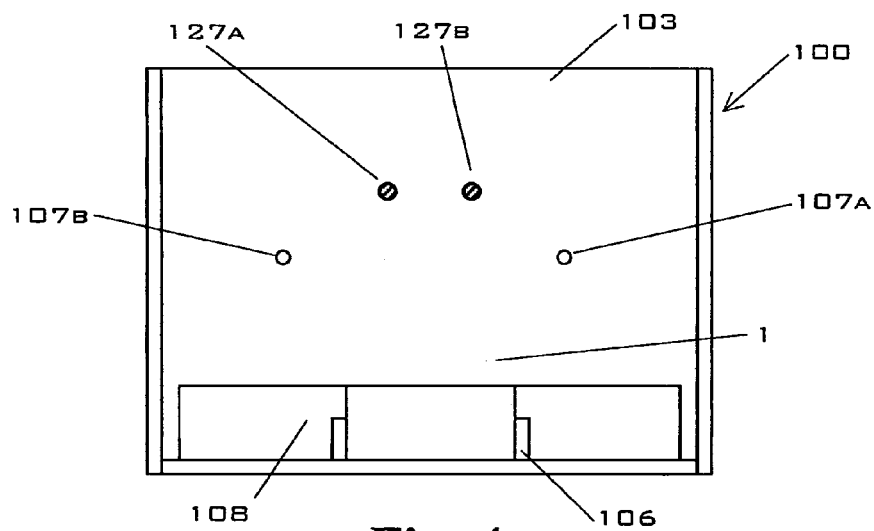
FIG. 4 is a rear elevation view of the present invention showing opening allowing access to lift and control module.
Figure 5:
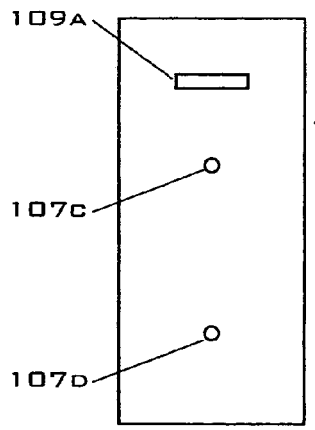
FIGS. 5–6 are side elevation views of the present invention showing handle opening and mounting holes.
Figure 6:
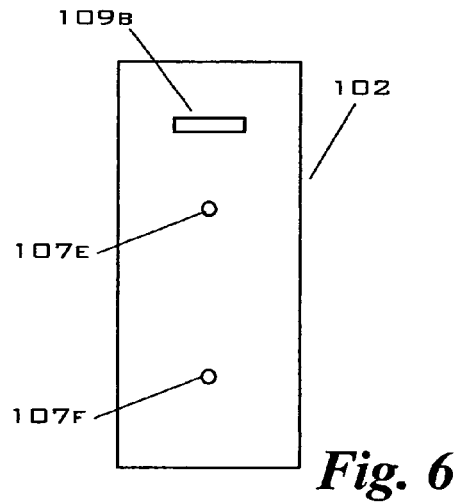

Referring now to FIGS. 5 and 6, left panel 101 and right panel 102 each have a handle opening 109a and 109b, respectively. Handle openings 109a, 109b facilitate movement of the sub-cabinet 100 as well as provide a hand grip during insertion and removal of the sub-cabinet 100 from a cabinet. Left panel 101, right panel 102, and back panel 103 may also include one or more mounting holes 107, see 107a and 107b in FIG. 4, 107c and 107d in FIG. 5, and 107e and 107f in FIG. 6. Mounting holes 107a–107f should be of sufficient diameter for the passage of a screw or bolt for the attachment of the sub-cabinet 100 to a larger cabinet.

Figure 3:
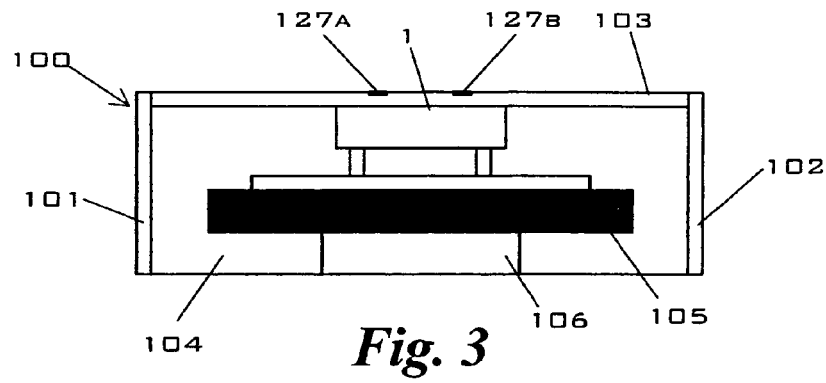
FIG. 3 is a top elevation view of the present invention showing television, lift and control module within sub-cabinet structure.

Referring now to FIGS. 3 and 4, the lift 1 is fastened to the back panel 103 via a pair of fasteners 127a, 127b, preferably flat head screws or bolts recessed within the back panel 103. The lift 1 is vertically disposed within the sub-cabinet 100 and perpendicular to the floor panel 104. An opening 108 is provided along one end of the back panel 103 adjacent to the floor panel 104 so as to allow access to motor 7, drive screw 8 and control module 106. The control module 106 is fastened to the floor panel 104 at a location so as to avoid interference with the operation of the lift 1.

FIG. 7 shows an exemplary decorative cabinet 110 having an interior cavity of sufficient physical dimensions so as to accommodate the insertion of a sub-cabinet 100. Referring now to FIG. 8, the interior of the decorative cabinet 110 is shown having a sub-cabinet 100 positioned along a wall 124 of the decorative cabinet 110 and fastened thereto via bolts or screws passing through the mounting holes 107a and 107b described above. In this embodiment, the sub-cabinet 100 occupies a portion of the total interior volume of the decorative cabinet 110.

Referring now to FIG. 9, the lift 1 is shown extended so that the television 105 is visibly displayed. During the extension of the lift 1, contact is achieved between lift 1 and a lid 111 hinged to the decorative cabinet 110. The lid 111 is freely movable thereby allowing the unimpeded movement of the lift 1. During retraction of the lift 1 and television 105 into the sub-cabinet 100, the weight of the lid 111 ensures movement to its original closed position shown in FIG. 8.

Figure 10:
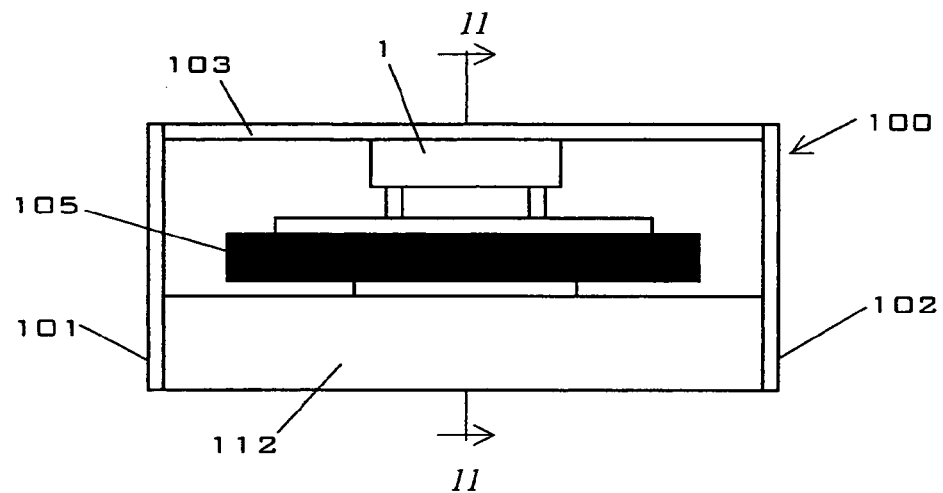
FIG. 10 is a top elevation view of an alternate embodiment of the present invention having a storage area adjacent to the television.
Figure 11:
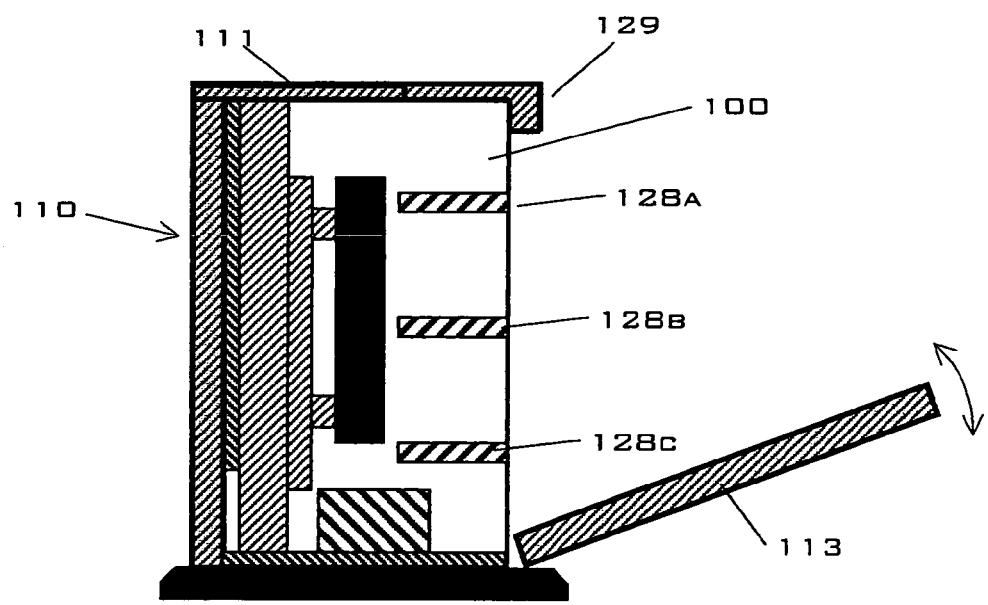
FIG. 11 is a section view of the decorative cabinet with sub-cabinet having several shelves within the storage area.

Referring now to FIGS. 10 and 11, an alternate embodiment of the present invention is shown wherein the sub-cabinet 100 occupies the entire interior volume of the decorative cabinet 110. A storage area 112 is provided in front of the television 105. While a variety of configurations are possible for the storage area 112, an exemplary embodiment may include one or more shelves 128a–128c horizontally disposed between and fastened, via techniques described above, to left panel 101 and right panel 102. A single horizontally hinged door 113, as shown in FIG. 11, or a pair of vertically hinged elements are provided along the cabinet front 129 to provide access to the storage area 112. The described door 113 should be of sufficient dimensional extent so as to allow insertion and removal of sub-cabinet 100 from decorative cabinet 110.

Figure 12:
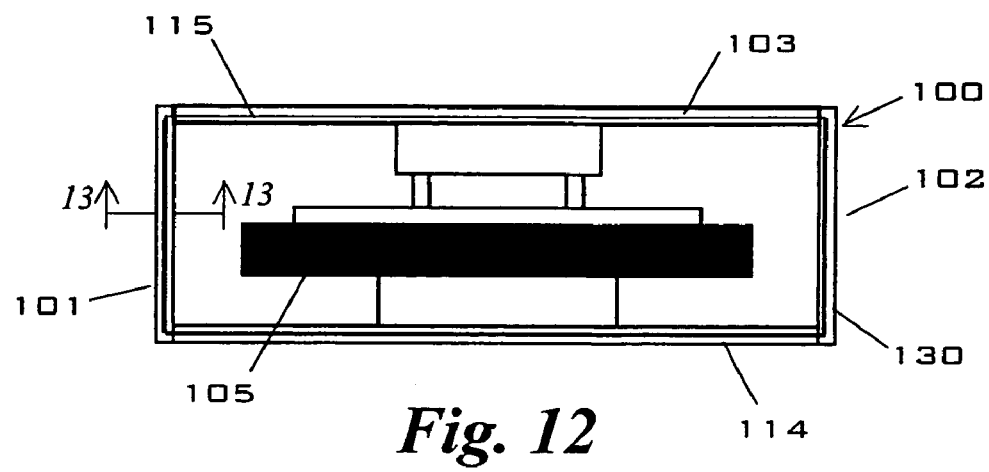
FIG. 12 is a top elevation view of an alternate embodiment of the present invention having a front panel and a safety strip disposed along the upper edge of the cabinet.
Figure 14:
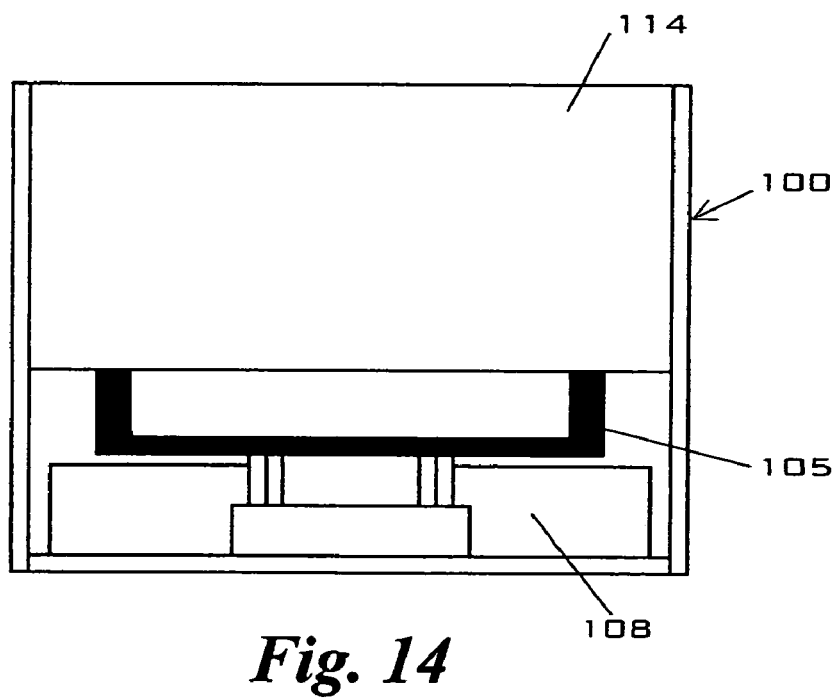
FIG. 14 is a front elevation view of the alternate embodiment described in FIG. 12.

Referring now to FIGS. 12 and 14, an additional embodiment of the present invention is shown having a front panel 114 parallel to the back panel 103 and fastened to left panel 101 and right panel 102, via construction techniques described above. The front panel 114 may completely shield the interior of the sub-cabinet 100 or partially shield the interior as represented in FIG. 14. The front panel 114 may function as a protective cover preventing damage to the television 105 when stored within the decorative cabinet 110. Also, the front panel 114 may be desired to further stiffen the structure of the sub-cabinet 100.

Figure 13:
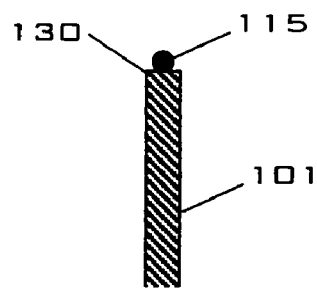
FIG. 13 is a section view showing safety strip secured along the upper edge.

Referring to FIG. 12, an optional safety strip 115 is shown attached along one end of the panels comprising the sub-cabinet 100. It is equally possible for the safety strip 115 to be placed along a portion of the exposed edge 130. FIG. 13 shows an exemplary safety strip 115 as it might appear along the edge 130 of the sub-cabinet 100 adjacent to the lid 111. While a variety of attachment techniques are possible including but not limited to mechanical fasteners, it is preferred to adhesively bond the safety strip 115 to the edge 130.

Figure 15:
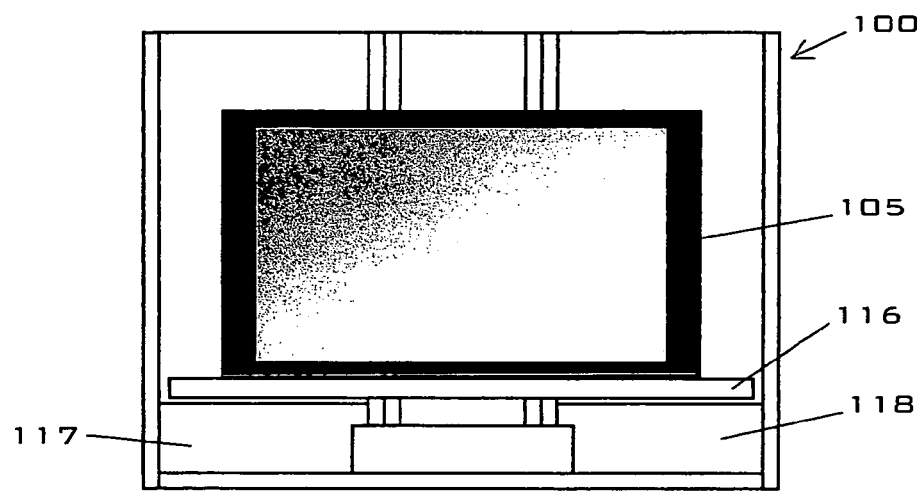
FIG. 15 is a front elevation view of an alternate embodiment having a shelf separating television from component storage areas.

Referring to FIG. 15, a further embodiment is shown having a shelf 116 horizontally disposed and below the television 105. The shelf 116 may be attached to and moved by the lift 1. The shelf 116 prevents the intrusion of wires and cables within the sub-cabinet 100 into component storage areas 117 and 118 to either side of the lift 1. Component storage areas 117 and 118 should be sufficiently voluminous so as to accommodate a VCR, DVD, receiver unit or other device commonly found within an entertainment center.

Figure 16:
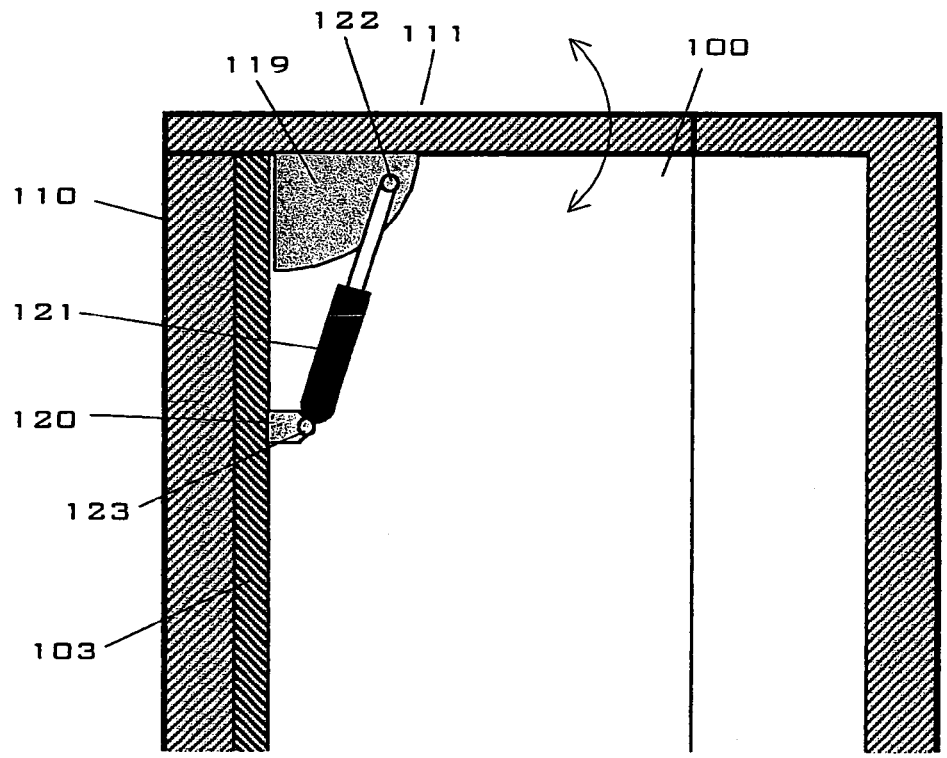
FIG. 16 is an interior view of decorative cabinet showing closer device attached between lid and cabinet wall.

Referring now to FIG. 16, a spring or gas-filled closer 121, commonly known within the art, is shown rotatably disposed within the sub-cabinet 100. The closer 121 is attached at one end via a pin 123 to a bracket 119 thereafter fastened to the lid 111 and at the other end via a pin 122 to a bracket 120 thereafter fastened to the back panel 103. The closer 121 provides for a more controlled opening and closing of the hinged lid 111 during extension and retraction of the lift 1.

Figure 17:
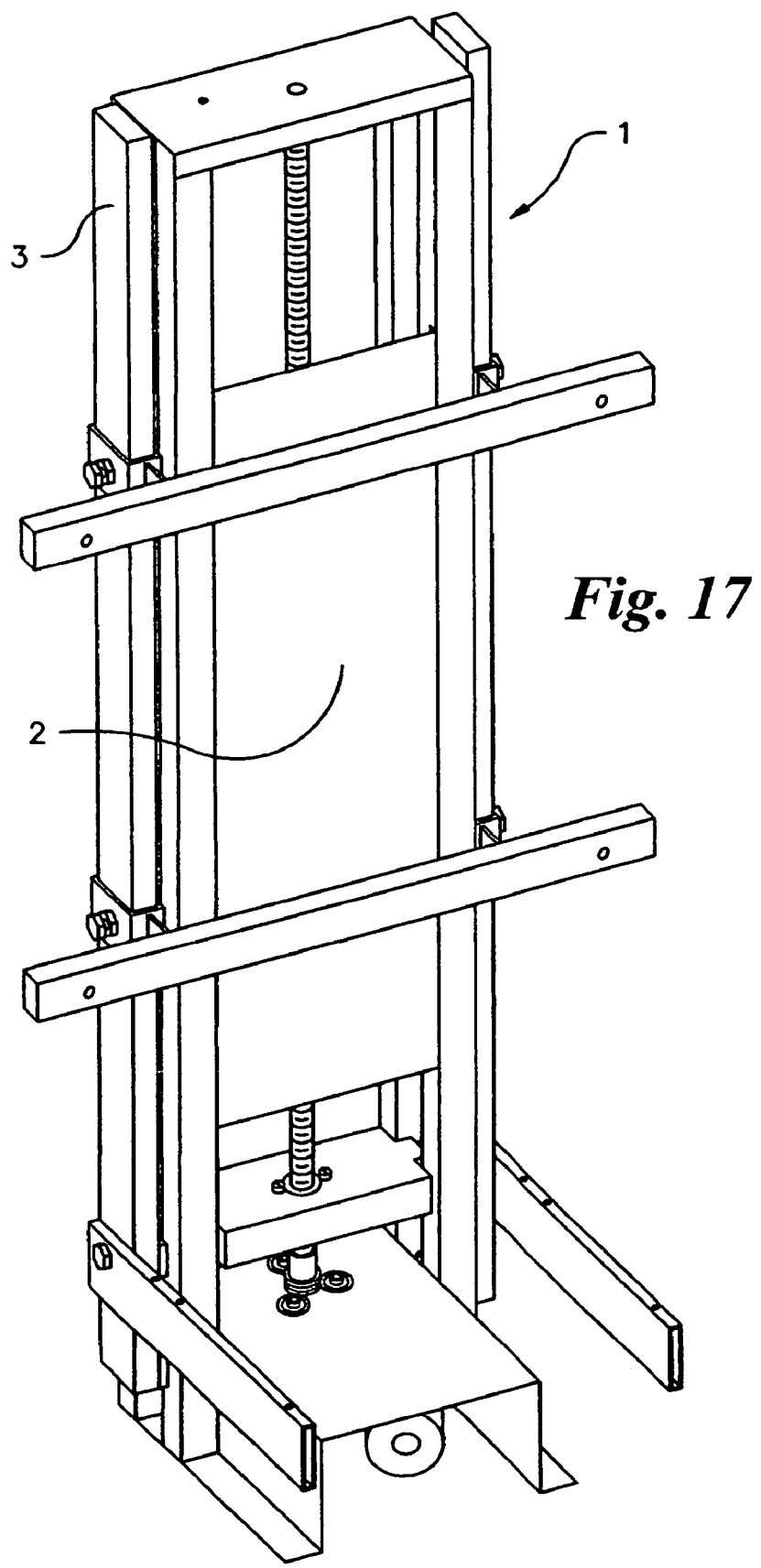
FIG. 17 is a perspective view of an exemplary lift device with support unit retracted.
Figure 18:
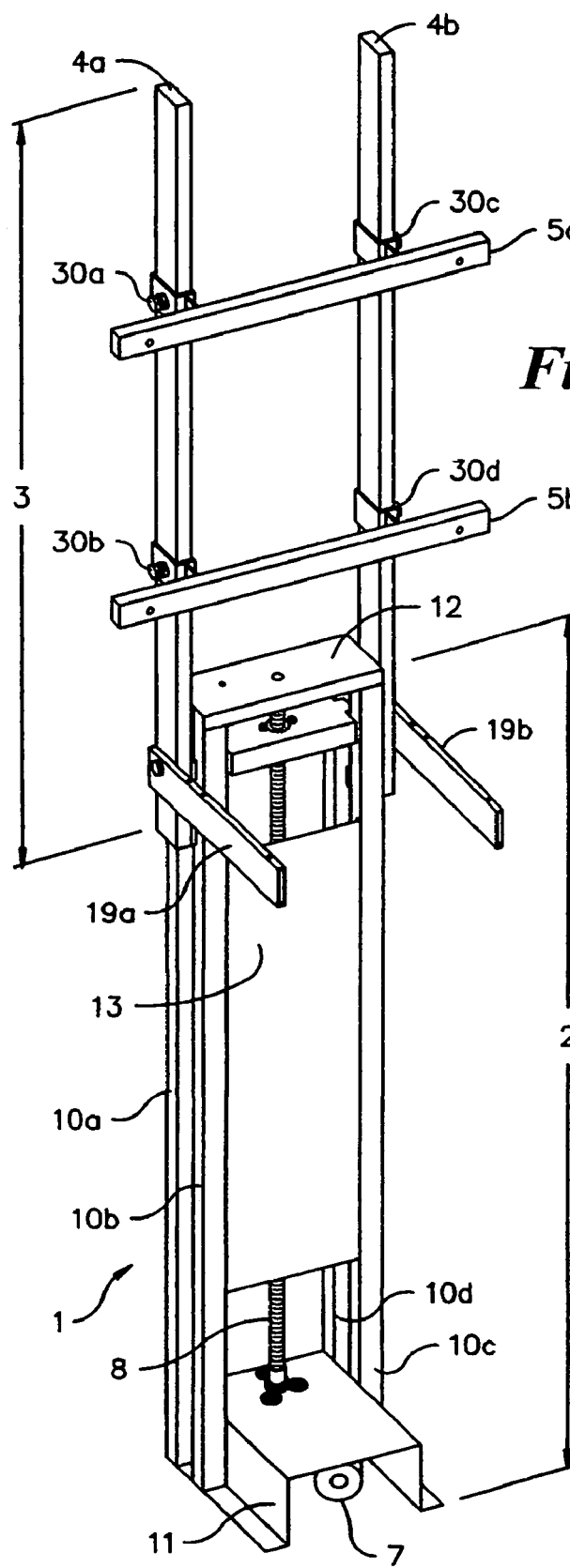
FIG. 18 is a perspective view of the exemplary lift device with support unit extended.

While a variety of mechanical lifts known within the art are applicable to the present invention, preferred embodiments are comprised of the device shown and described below. Referring now to FIG. 17, a preferred lift 1 is shown in its retracted state wherein a support unit 3 is telescoped about a base unit 2. Whereas, FIG. 18 shows the same lift 1 having the support unit 3 extended above the base unit 2.

Figure 19:
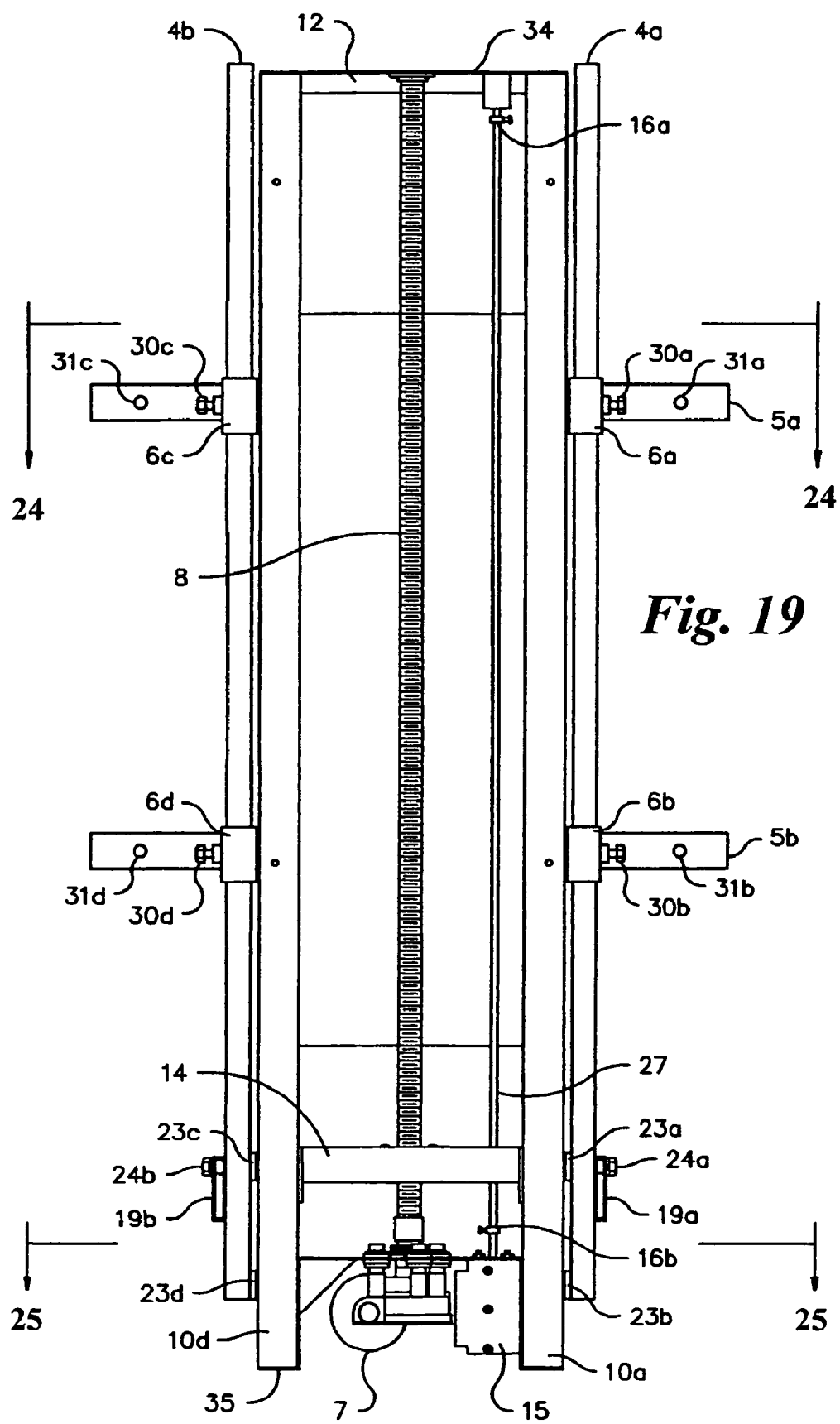
FIG. 19 is an elevation view of the rear of the exemplary lift showing screw, motor, limit switch, and elevator element.
Figure 20:
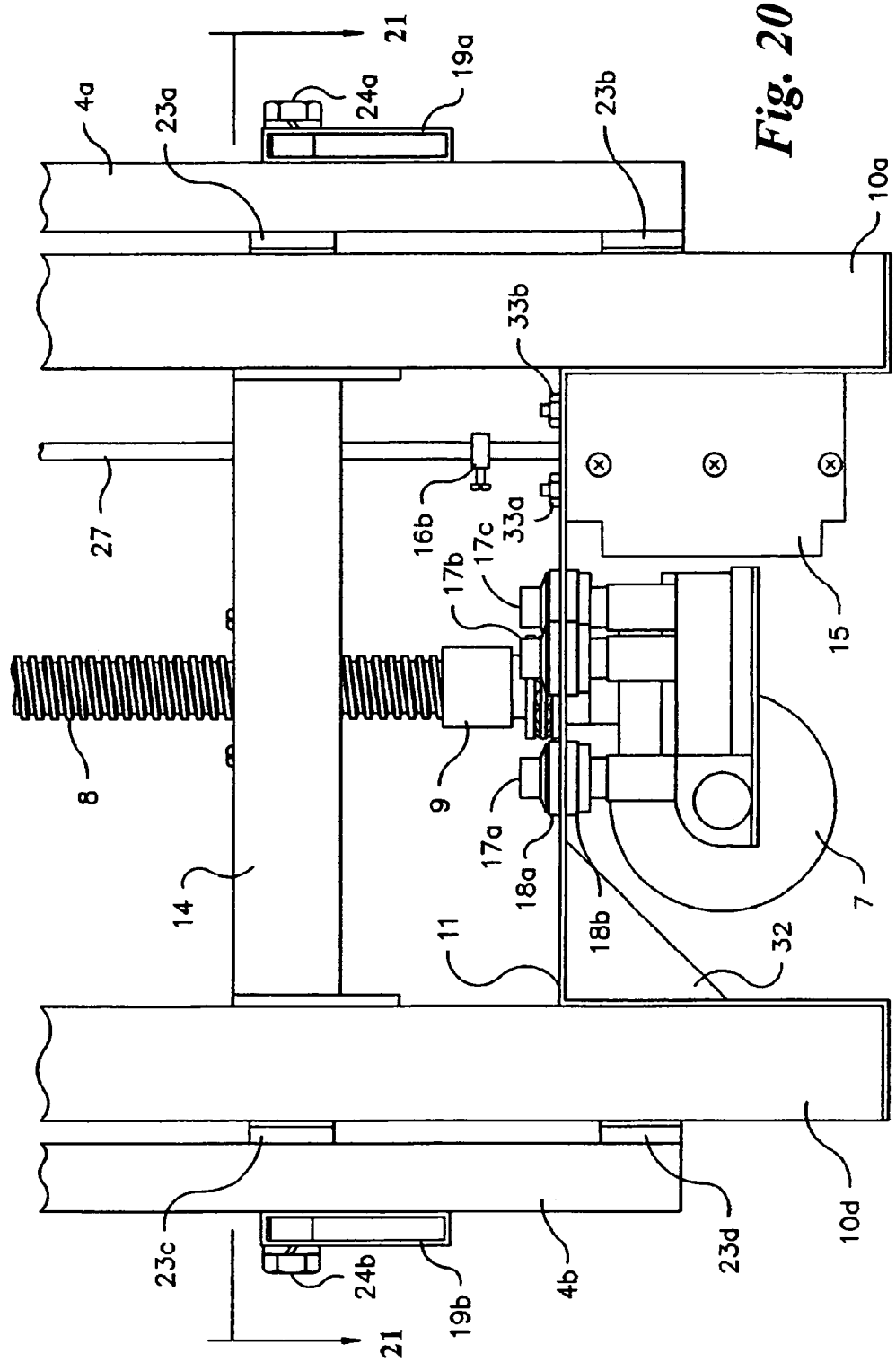
FIG. 20 is an enlarged view showing motor attached to base plate and directly coupled to drive screw.

Referring again to FIG. 18, the base unit 2 is comprised of a base plate 11, four rails 10a–10d, an end plate 12, and a stiffener 13. The base plate 11 is a U-shaped element fabricated from sheet metal, preferably steel. Rails 10a–10d are either solid or hollow in construction, preferably having a square or rectangular cross section. Rails 10a–10d are arranged in pairs, 10a–10b and 10c–10d, to either side of the U-shaped base plate 11 so that one end of each rail 10a–10d contacts the base plate 11 adjacent to the lower end 35, as described in FIG. 19. Rails 10a–10d are welded or fastened to the base plate 11, via techniques understood in the art, so as to be upwardly disposed and perpendicular to the base plate 11. Rails 10a–10b and 10c–10d are arranged so as to be physically separated by a uniform gap. The spacing between pairs of rails 10a–10b, 10c–10d enables T-shape guides 23a–14 23d to slide along the rails 10a–10d. An end plate 12 of sheet metal construction is welded or fastened to the end of rails 10a–10d at the upper end 34, as described in FIG. 19. A stiffener 13 of sheet metal construction is welded to the frontmost rails 10b–10c or backmost rails 10a–10d so as to minimize flexure of the base unit 2 during operation. Optional brackets 32 are welded or fastened to the base plate 12 to further stiffen the base unit 2, as shown in FIG. 20.

Referring again to FIG. 18, the support unit 3 is comprised of a pair of separately disposed and parallel vertical support elements 4a–4b thereby fastened to a pair of likewise separately disposed and parallel horizontal support elements 5a–5b. A pair of separately disposed and parallel horizontal rests 19a–19b are secured by fasteners 24a–24b to one end of the vertical support elements 4a–4b, as shown in FIG. 18. Horizontal support elements 5a–5b, vertical support elements 4a–4b, and horizontal rests 19a–19b are fabricated from metal, preferably steel or aluminum, having a solid or hollow cross section. Mounting holes 31a–31d are provided along horizontal support elements 5a–5b so as to accommodate hardware to secure the low-profile television 105 to the support unit 3.

Figure 24:
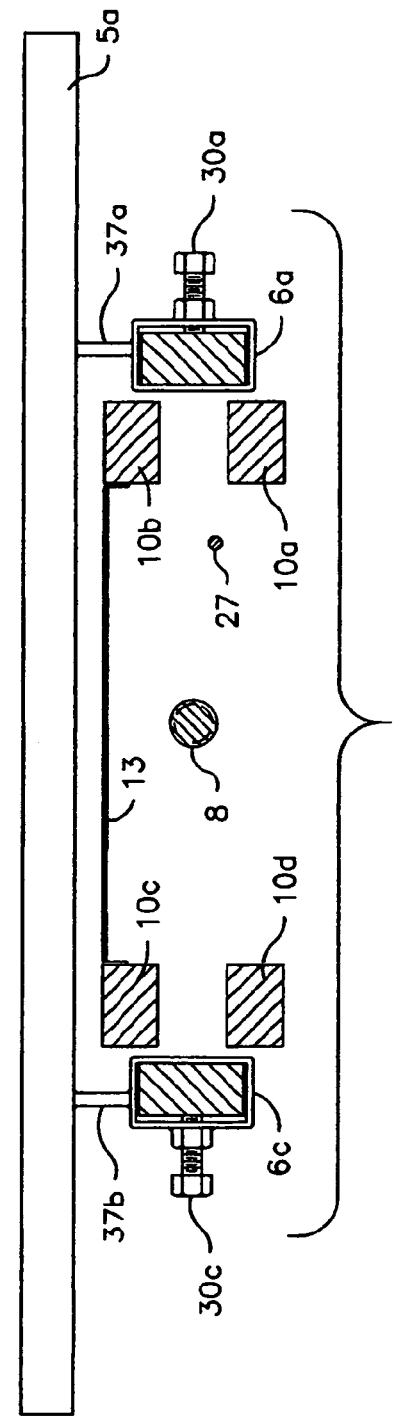
FIG. 24 is a section view showing attachment of horizontal support element to vertical support element.

Referring now to FIG. 24, horizontal support elements 5a–5b are secured to vertical support elements 4a–4b via brackets 6a–6d and fasteners 30a–30d so to provide adjustability for various mounting requirements. Brackets 6a–6d have a hollow cross section so as to facilitate sliding movement along the vertical support elements 4a–4b. Brackets 6a–6d are locked in place by tightening a fastener 30a–30d into the vertical support element 4a–4b. Brackets 6a–6d are fixed to the horizontal support elements 5a–5b via flanges 37a–37b. Flanges 37a–37d are welded, via techniques understood in the art, to horizontal support elements 5a–5b and brackets 6a–6d. Brackets 6a–6d and flanges 37a–37d are fabricated from metal, preferably steel or aluminum.

Referring again to FIG. 19, motor 7 and drive screw 8 are shown parallel and equidistant from rails 10a–10b and rails 10c–10d. A representative drive screw 8 is a threaded rod of linear extent fabricated from a metal, preferably steel. Also shown in FIG. 19 is a limit switch 15 having a rod 27 projecting from one end so as to span the distance between base plate 11 and end plate 12. Stops 16a–16b composed of a metal cylinder with set screw are secured to the rod 27 adjacent to base plate 11 and end plate 12.

Referring now to FIG. 20, the motor 7 is secured to the base plate 12 via fasteners 17a–17c. While various motor 7 types are applicable to the present invention, preferred embodiments were reversible and DC powered. One specific example being a 24V motor, model number 403.979 manufactured by Valeo Auto-Electric Wischer und Motoren GmbH (Motors and Actuators Division) with an office at Stuttgarter Strasse 119 D-74321 Bietigheim, Germany.

Figure 22:
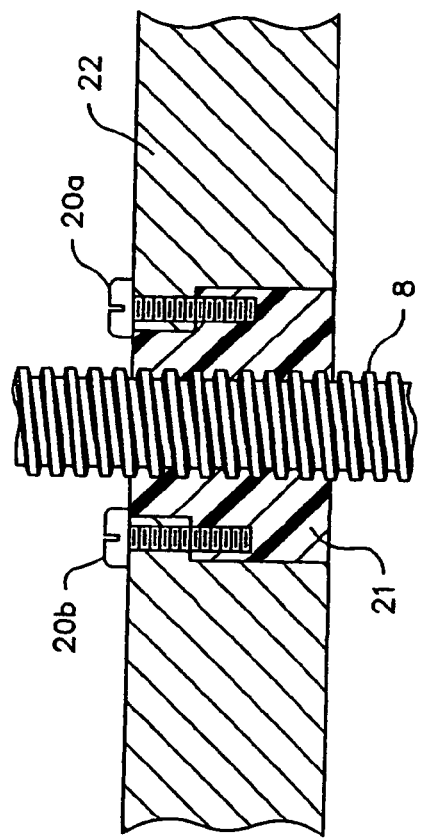
FIG. 22 is a section view showing drive screw coupled to elevator element via a nut.
Figure 23:
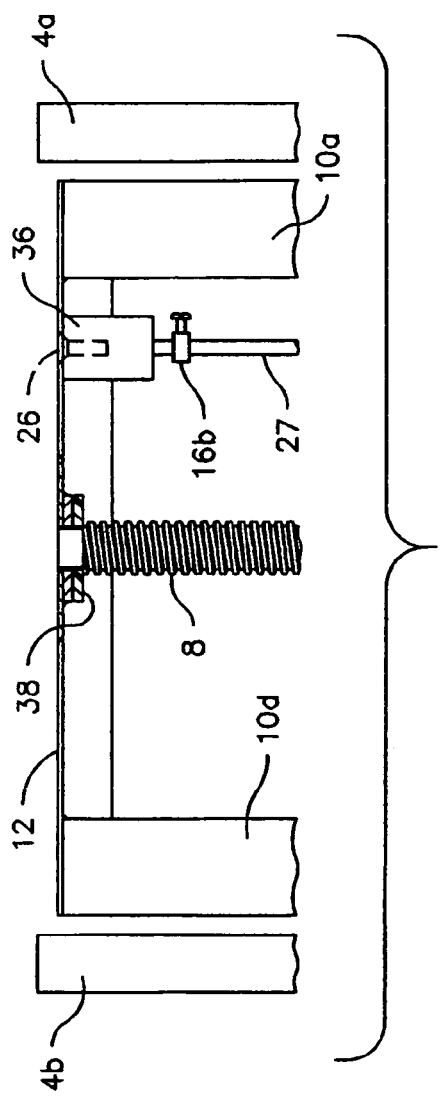
FIG. 23 is a partial section view of end plate showing attachment of screw and limit switch rod thereto.

An optional pair of washers 18a–18b is disposed about the base plate 11 for each fastener 17a–17c so as to prevent direct contact between motor 7 and base plate 11. It is preferred that washers 18a–18b be composed of a vibration damping material, examples including but not limited to elastomers, polymers, and lead. A rotating shaft extending from the motor 7 is directly coupled to the drive screw 8 via a coupler 9. The coupler 9 is a metal cylinder having a cavity conforming to the end of both rotating shaft and drive screw 8. The drive screw 8 extends above the coupler 9 passing through the elevator element 14, as shown in FIGS. 21 and 22, and secured to the end plate 12, as shown in FIG. 23.

Referring again to FIG. 20, the limit switch 15 is fastened to the base plate 12 via nuts 33a–33b. The rod 27 extends above the base plate 12 passing through a hole in the elevator plate 22, as shown in FIG. 21, and secured to the end plate 12, as shown in FIG. 23. The rod 27 is freely movable along its length so that contact between elevator plate 22 and stops 16a or 16b move the rod 27 thereby communicating a STOP command to the motor 7 from the limit switch 15. While limit switches 15 are known within the art, preferred embodiments of the present invention were composed of a mechanically activated two position electrical device.

Figure 21:
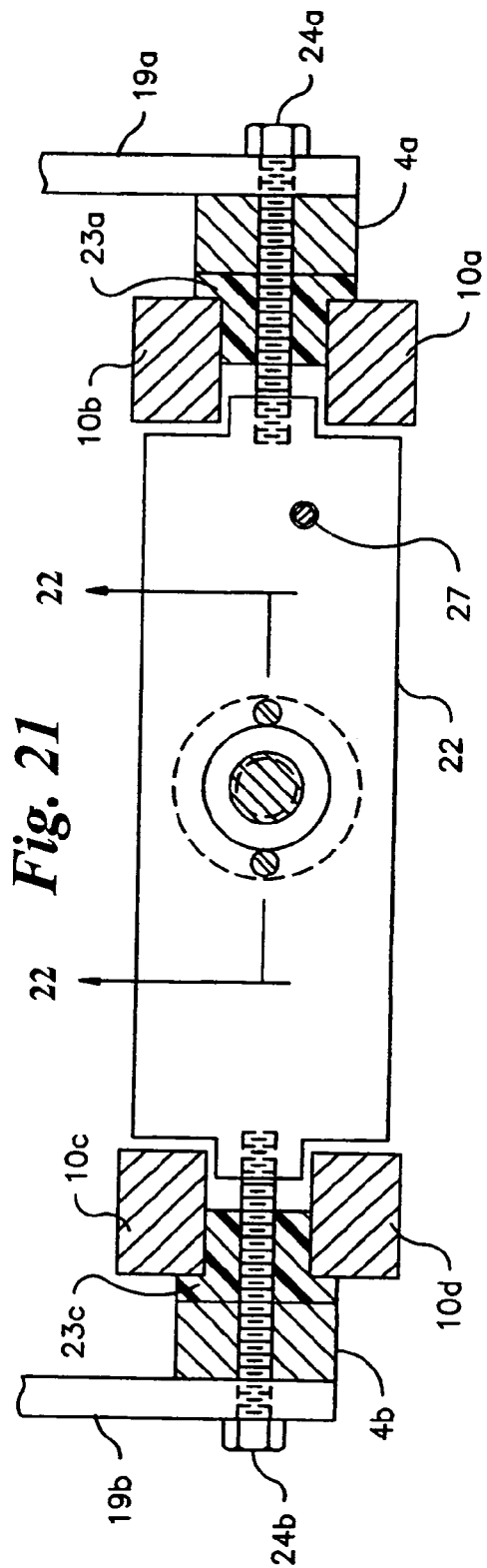
FIG. 21 is a section view of elevator element showing coupling of elevator plate to rails via T-shaped guides.

Referring now to FIG. 21, the elevator element 14 is shown comprised of an elevator plate 22, a pair of T-shaped guides 23a, 23c, and a nut 21. The preferred elevator plate 22 is shaped as shown in FIG. 21 approximately 1-inch thick and composed of a metal having a cavity centrally located along its planar extent to accommodate the nut 21. One T-shaped guide 23c of comparable thickness to the elevator plate 22 is positioned so that it partially occupies the space between two rails 10c–10d. A second T-shaped guide 23a is positioned so as to contact two rails 10a–10b on the opposite side of the base unit 2. A fastener 24b passes through horizontal rest 19b, vertical support element 4b, and T-shaped guide 23c and thereafter threaded into a cavity within the elevator plate 22 so as to secure components to each other and to the rails 10c–10d. A likewise arrangement secures T-shaped guide 23b, vertical support element 4a, and horizontal rest 19 to the opposite end of the elevator plate 22.

The T-shaped guides 23a, 23c prevent contact between vertical support elements 4a–4b and rails 10a–10d, as well as between elevator plate 22 and rails 10a–10d. Furthermore, the pair of T-shaped guides 23a, 23c constrain travel of the support unit 3 lengthwise along the paired rails 10a–10b and 10c–10d. As such, it is preferred that the T-shaped guides 23a, 23c be comprised of a low-friction material preferably a polymer, one example being polytetrafluorethylene, also known to as PTFE.

Referring now to FIG. 22, the nut 21 extends through the elevator plate 22. The profile of the nut 21 shown in FIG. 22 communicates loading exerted by the drive screw 8 onto the nut 21 into the elevator plate 22 and facilitates attachment of nut 21 to the elevator plate 22 via fasteners 20a, 20b. The nut 21 has a hole through its thickness with a thread pattern matching that of the drive screw 8. It is preferred that the nut 21 be constructed of a material minimizing friction with the drive screw 8. Therefore, preferred embodiments are comprised of a low-friction polymer, preferably PTFE.

Referring now to FIG. 23, the attachment of drive screw 8 and rod 27 to the end plate 12 is shown. The drive screw 8 passes through a hole in the end plate 12 so as to prevent lateral movement of the drive screw 8 but allowing rotational movement. Friction is minimized via a washer 38 composed of a low friction polymer, preferably PTFE, placed between end plate 12 and drive screw 8.

Referring again to FIG. 23, the rod 27 is secured within a cavity along a mounting cap 36 composed of a low-friction polymer and attached to the end plate 12 via a fastener 26. It is desired that the rod 27 be freely movable lengthwise into and out of the mounting cap 36 so as to enable function of limit switch 15.

Figure 25:
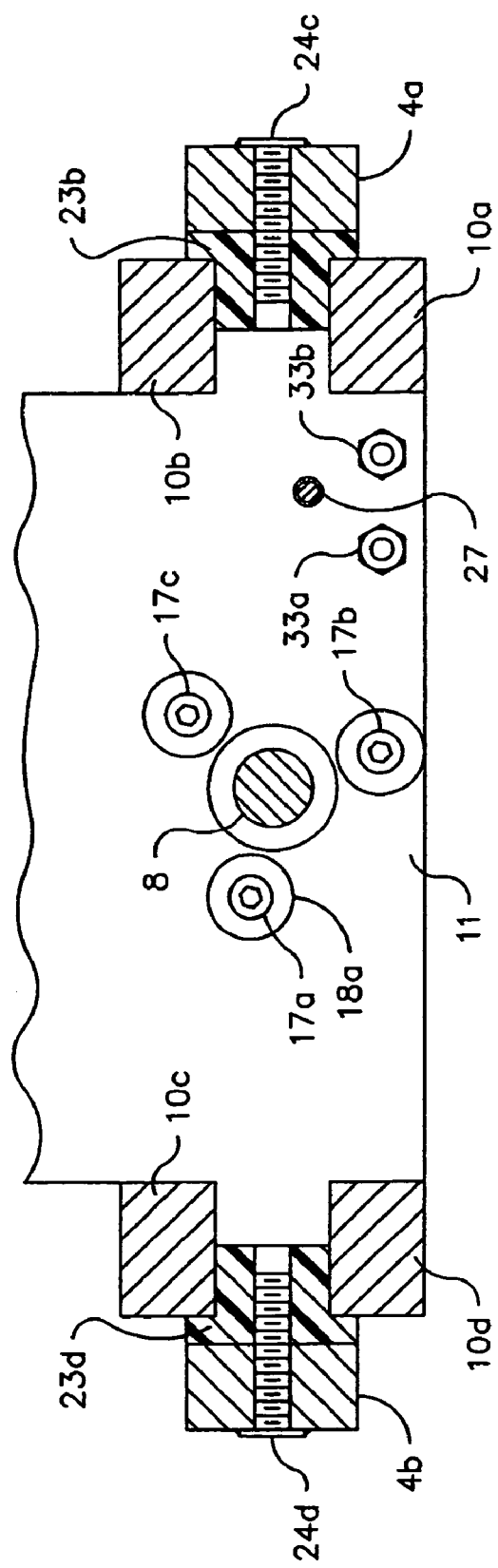
FIG. 25 is a section view showing T-shaped guide slidably disposed between rails and fastened to vertical support elements.

Referring now to FIG. 25, a second pair of T-shaped guides 23b, 23d are shown attached via fasteners 24c, 24d to the vertical support elements 4a–4b. One T-shaped guide 23b is slidably disposed between rails 10a and 10b. Whereas, a second T-shaped guide 23d is slidably disposed between rails 10c and 10d. The paired arrangement of T-shaped guides 23a–23b and 23c–23d along vertical support elements 4a and 4b, respectively, prevents rotational movement of the support unit 3 transverse to the travel axis of the lift 1.

Figure 26:
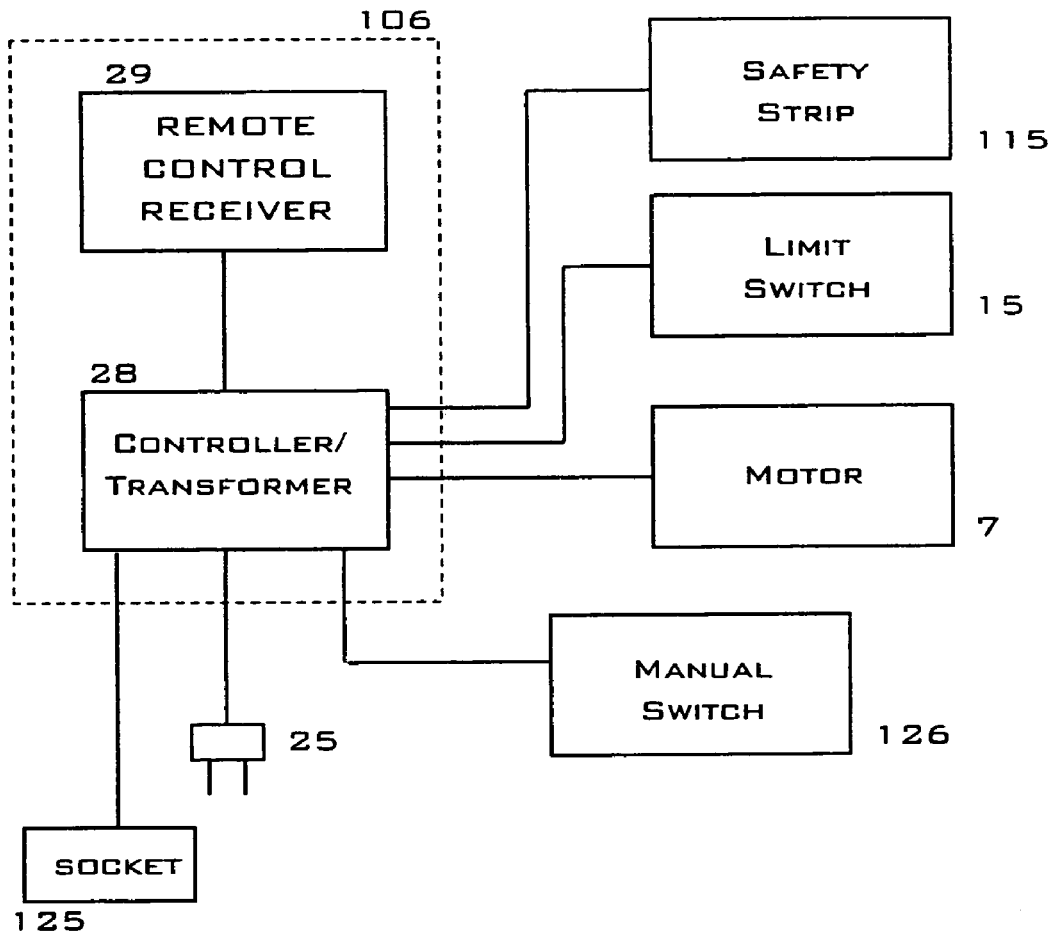
FIG. 26 is a block diagram of motion control circuit for an exemplary embodiment.

Referring now to FIG. 26, a block diagram describes the control function of the motor 7 and hence the motion of the support unit 3 within the sub-cabinet 100.

A control module 106 is comprised of a controller/transformer 28 and an optional remote control receiver 29 electrically connected thereto. The controller/transformer 28 is further electrically connected to a safety strip 115 attached to the sub-cabinet 100, a limit switch 15 and a motor 7 within the lift 1, an optional switch 126 also attached to the exterior of the sub-cabinet 100, and a socket 125 within the sub-cabinet 100.

Lift 1 function is initiated by a remote control receiver 29 and/or a switch 126. The remote control receiver 29 is an electrical component understood in the art capable of receiving wireless commands, via either an RF or an IR signal, as to the transmission of power from the controller/transformer 28 to the motor 7. A mechanical button or toggle type device, both understood in the art, is applicable to the switch 126 and provides for the ON and OFF transmission of power from the controller/transformer 28 to the motor 7. The controller/transformed 28, also a component understood in the art, receives AC power via a power cord 25 thereafter converting it to DC before communicating it to the motor 7 in a controlled fashion. Contact between elevator plate 22 and stop 16a moves the rod 27 downward thereby mechanically tripping the limit switch 15 and sending an electrical command to the controller/transformer 28 to terminate power to the motor 7. Likewise, contact between elevator plate 22 and stop 16b moves the rod 27 upward thereby mechanically tripping the limit switch 15 and sending an electrical command to the controller/transformer 28 to terminate power to the motor 7. In either event, rotation of the drive screw 8 ceases thereby stopping travel of support unit 3. Additionally, the rotational direction of the motor 7 is reversed for a subsequent reactivation of the motor 7.

The safety strip 115 is a contact sensitive device understood in the art that communicates the occurrence of a physical contact between an object and the safety strip 115 to the controller/transformer 28. An exemplary safety strip 115 includes the pressure sensitive device described and claimed by Burgess in U.S. Pat. No. 6,329,617. Upon receipt of a contact by the safety strip 115, the controller/transformer 28 reverses the direction of the support unit 3 so as to open the lid 111 thereby preventing damage or injury to the object.

The socket 125 is a device understood in the art that facilitates an electrical connection between the controller/transformer 28 and the television 105. The controller/transformer 28 regulated power to the socket 125 so that the television 105 is ON when the support unit 3 is extended and OFF when the support unit 3 is retracted.

The description above indicates that a great degree of flexibility is offered in terms of the present invention. Although the present invention has been described in considerable detail with reference to certain preferred versions thereof, other versions are possible. Therefore, the spirit and scope of the appended claims should not be limited to the description of the preferred versions contained herein.

What is claimed is:

1. A method of manufacturing a plurality of articles of furniture each having a lift, comprising the steps of:
   pre-assembling a plurality of slide-in modular sub-cabinets having the same standardized dimensions, said sub-cabinets each comprising:
      a box-like structure having at least three panels disposed about a floor panel and attached thereto, and wherein the dimensions of each pre-assembled box-like structure are the same as the dimensions of the other pre-assembled box-like structures:
      a lift vertically disposed within said box-like structure and fastened to respective ones of said panels; and
      a control module disposed within said box-like structure and fastened thereto, said control module structured and arranged to receive commands so as to direct motion of said lift;
   providing a plurality of articles of furniture with cavities structured and arranged to receive said modular sub-cabinets of standardized dimensions; and
   fastening said pre-assembled modular sub-cabinets within said articles of furniture, thereby forming the articles of furniture having a lift by sliding in the modular sub-cabinets into said cavities.

2. The method of claim 1, further comprising a step of installing a safety strip adapted to reverse the direction of said lift when contacted.

3. The method of claim 2, further comprising a step of installing a safety strip about an edge along one or more of said at least three panels adjacent to a movable lid.

4. A method of manufacturing a plurality of articles of furniture each having a lift, comprising the steps of:
   pre-assembling a plurality of slide-in modular sub-cabinets having the same standardized dimensions, said sub-cabinets each comprising:
      a box-like structure having at least three panels, and wherein the dimensions of each pre-assembled box-like structure are the same as the dimensions of the other pre-assembled box-like structures;
      a lift vertically disposed within said box-like structure and fastened to respective ones of said panels; and
      a control module disposed within said box-like structure and fastened thereto, said control module structured and arranged to receive commands so as to direct motion of said lift;
   providing a plurality of articles of furniture with cavities structured and arranged to receive said modular sub-cabinets of standardized dimensions; and
   fastening said pre-assembled modular sub-cabinets within said articles of furniture, thereby forming the articles of furniture having a lift by sliding in the modular sub-cabinets into said cavities.

5. The method of claim 4, further comprising a step of installing a safety strip adapted to reverse the direction of said lift when contacted.

6. The method of claim 4, further comprising a step of installing a safety strip about an edge along one or more of said at least three panels adjacent to a movable lid.

* * * * *